US009263897B2

(12) United States Patent
Katou

(10) Patent No.: US 9,263,897 B2
(45) Date of Patent: Feb. 16, 2016

(54) POWER SUPPLY CONTROL SYSTEM

(75) Inventor: Ichirou Katou, Miyagi (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 475 days.

(21) Appl. No.: 13/991,700

(22) PCT Filed: Mar. 21, 2012

(86) PCT No.: PCT/JP2012/001914
§ 371 (c)(1),
(2), (4) Date: Jun. 5, 2013

(87) PCT Pub. No.: WO2012/132314
PCT Pub. Date: Oct. 4, 2012

(65) Prior Publication Data
US 2013/0264873 A1    Oct. 10, 2013

(30) Foreign Application Priority Data

Mar. 29, 2011    (JP) ................................. 2011-073705

(51) Int. Cl.
| H01H 19/64 | (2006.01) |
| H02J 4/00 | (2006.01) |
| H02J 7/02 | (2006.01) |
| H02J 7/35 | (2006.01) |
| H02J 3/32 | (2006.01) |

(Continued)

(52) U.S. Cl.
CPC ................. *H02J 4/00* (2013.01); *H02J 7/0068* (2013.01); *H02J 7/02* (2013.01); *H02J 7/35* (2013.01); *H02J 3/32* (2013.01); *H02J 3/383* (2013.01); *H02J 7/0013* (2013.01); *Y02E 10/563* (2013.01); *Y02E 10/566* (2013.01); *Y10T 307/406* (2015.04)

(58) Field of Classification Search
CPC ............. H02J 4/00; H02J 3/32; H02J 7/0013; Y10T 307/406; Y02E 10/563
USPC ......................................................... 307/113
See application file for complete search history.

(56) References Cited

U.S. PATENT DOCUMENTS

| 6,313,723 B1 | 11/2001 | Chen et al. |
| 2011/0025124 A1* | 2/2011 | Brabec ................ B60L 11/1861 |
| | | 307/9.1 |

FOREIGN PATENT DOCUMENTS

| CN | 101043143 | 9/2007 |
| CN | 101267128 | 9/2008 |
| CN | 101277009 | 10/2008 |

(Continued)

OTHER PUBLICATIONS

A Chinese Office Action issued Jan. 23, 2015 in corresponding Chinese Patent Application No. 201280004027.7 (with English translation of search report).

(Continued)

*Primary Examiner* — Jared Fureman
*Assistant Examiner* — Duc M Pham
(74) *Attorney, Agent, or Firm* — Wenderoth, Lind & Ponack, L.L.P.

(57) ABSTRACT

A power supply control system includes power supply switch devices each including main relays, sub relays, and control units and a control line connected to sub control lines for controlling the sub relays. The control units control the sub relays of other power supply switch devices via the control line.

6 Claims, 12 Drawing Sheets

(51) Int. Cl.
*H02J 3/38* (2006.01)
*H02J 7/00* (2006.01)

(56) References Cited

FOREIGN PATENT DOCUMENTS

| EP | 1 837 944 A2 | 9/2007 |
|---|---|---|
| EP | 1 837 944 B1 | 4/2014 |
| JP | 56-38946 | 4/1981 |
| JP | 01-274629 | 11/1989 |
| JP | 2002-532843 | 10/2002 |
| JP | 2004-222352 | 8/2004 |
| WO | 00/36624 | 6/2000 |
| WO | WO 2012/043723 A1 * | 4/2012 ............... H02J 7/02 |

OTHER PUBLICATIONS

International Search Report issued Jun. 26, 2012 in International (PCT) Application No. PCT/JP2012/001914.

Chinese Office Action issued Apr. 3, 2015 in corresponding Chinese Patent Application No. 201280004027.7 (with English translation).

* cited by examiner

Prior Art

POWER SUPPLY CONTROL SYSTEM

TECHNICAL FIELD

The present invention relates generally to power supply control systems, and, in particular, to a power supply control system including power supply switch devices.

BACKGROUND ART

As a conventional power supply control system, the configuration shown in FIG. 11 is known, for example. As shown in FIG. 11, the power supply control system 10 includes the power supply switch devices 22, 32, and 42 respectively included in the electrical apparatuses 20, 30, and 40 connected in parallel with respect to a power supply (not shown in FIG. 11).

The electrical apparatus 20 includes the body part 21 and the power supply switch device 22 for supplying power to the body part 21. Moreover, the power supply switch device 22 includes the breaker 23, the main relay 24, the rush-prevention relay 25, the control unit 26 for controlling the main relay 24 and the rush-prevention relay 25. It should be noted that since the configurations of the electrical apparatuses 30 and 40 and the configurations of the power supply switch devices 32 and 42 are the same as above, the explanation will be omitted here.

CITATION LIST

Patent Literature

[PTL 1] Japanese Unexamined Patent Application Publication No. 2004-222352
[PTL 2] Japanese Unexamined Patent Application Publication No. 2002-532843

SUMMARY OF INVENTION

Technical Problem

However, the conventional power supply switch device 22 has a problem that unnecessary power consumption of a whole system increases since the conventional power supply switch device 22 must also keep supplying power to devices in a standby state.

The present invention has been made in view of the above problem, and an object of the present invention is to provide a power supply control system which requires less power consumption.

Solution to Problem

A power supply control system according to an embodiment of the present invention includes a first power supply switch device and a second power supply switch device each connected to a power supply. The first power supply switch device supplies power from the power supply to a first load. The first power supply switch device includes: a first main relay which switches between an ON state in which power is supplied from the power supply to the first load and an OFF state in which power is not supplied; a first sub relay provided in parallel with the first main relay, the first sub relay switching between the ON state in which power is supplied from the power supply to the first load and the OFF state in which power is not supplied, so as to prevent a rush current from flowing into the first load; and a first control unit which is connected to a first main control line for controlling the first main relay and a first sub control line for controlling the first sub relay, and driven by power supplied from the power supply via one of the first main relay and the first sub relay. The second power supply switch device supplies power from the power supply to a second load. The second power supply switch device includes: a second main relay which switches between an ON state in which power is supplied from the power supply to the second load and an OFF state in which power is not supplied; a second sub relay provided in parallel with the second main relay, the second sub relay switching between the ON state in which power is supplied from the power supply to the second load and the OFF state in which power is not supplied, so as to prevent a rush current from flowing into the second load; and a second control unit which is connected to a second main control line for controlling the second main relay and a second sub control line for controlling the second sub relay, and driven by power supplied from the power supply via one of the second main relay and the second sub relay. The power supply control system further includes a common control line connected to the first sub control line and the second sub control line. The first control unit further controls the second sub relay via the common control line. Moreover, the second control unit further controls the first sub relay via the common control line.

It should be noted that a general or specific aspect of these may be achieved by a system, a method, or a computer program, or may be achieved by any combinations of systems, methods, and computer programs.

Advantageous Effects of Invention

According to the above configuration of the present invention, when one of the first and second power supply switch devices is in an operational state and the other is in a stopped sate, even if the second control unit is not constantly fed with power, the second power supply switch device can be activated by the first control unit. As a result, a power supply control system which requires less power consumption can be achieved.

DESCRIPTION OF EMBODIMENTS (Underlying Knowledge Forming Basis of the Present Invention)

The inventor of the present application found that the power supply switch device 22 recited in the "Background" section has the following problems.

Figure 11:
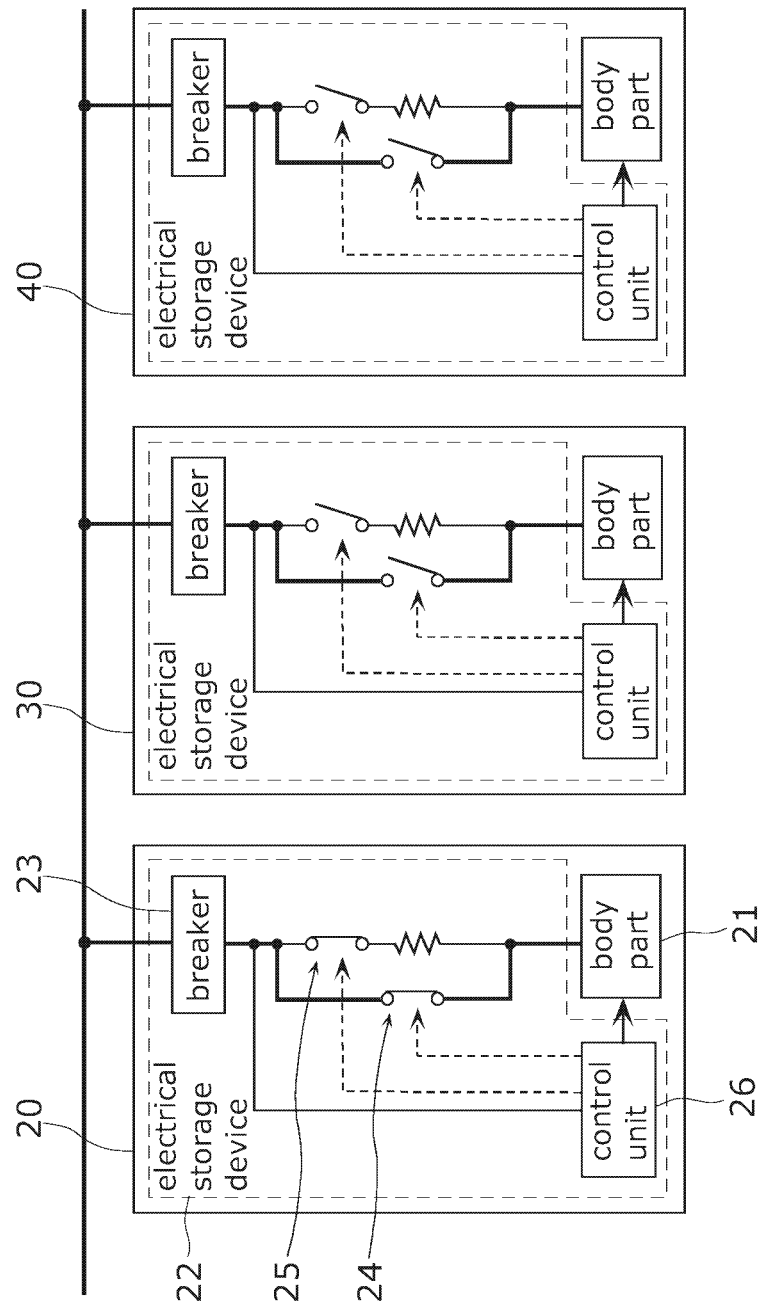
FIG. 11 illustrates a configuration of a conventional power supply control system.
Figure 12:
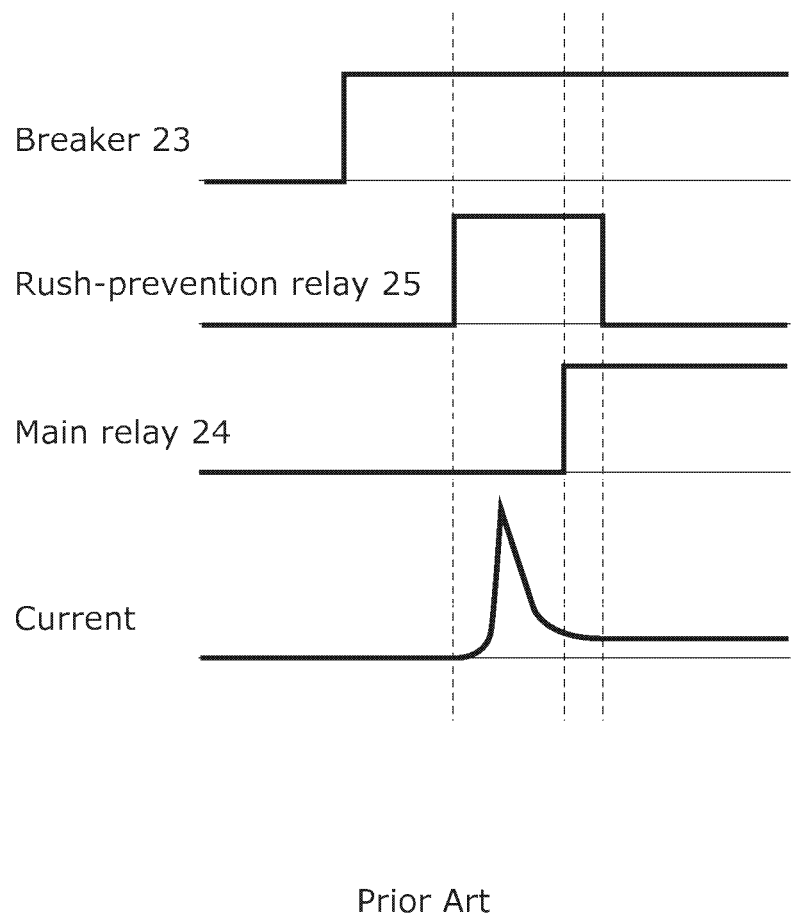
FIG. 12 illustrates the operation of a conventional power supply switch device.

With reference to FIG. 12, the following describes the operation of the power supply switch device 22 shown in FIG. 11.

A user switches the breaker 23 ON. This supplies power to the control unit 26. The control unit 26 switches the rush-prevention relay 25 ON, and thus the power is supplied from a power supply to the body part 21 via the rush-prevention relay 25. After some time has past since the rush-prevention relay 25 was switched ON, the control unit 26 switches the main relay 24 ON and the rush-prevention relay 25 OFF.

Thus, to start supplying power to the body part 21, the rush-prevention relay 25 having a resistor is switched ON so that rush current does not flow into the body part 21, and a control operation is performed that the main relay 24 is switched ON at the timing when the rush current has subsided.

However, to switch the rush-prevention relay 25 ON, the power supply switch device 22 must constantly feed power to the control unit 26. Specifically, as shown in FIG. 11, in a system causing the electrical apparatuses 20, 30, and 40 connected in parallel to operate sequentially, a device in a standby state also needs to be constantly supplied with power. Therefore, as the number of electrical apparatuses connected in parallel increases, unnecessary power consumption of a whole system increases.

In response to this, Patent Literatures 1 and 2 disclose examples of solutions to the problem.

Patent Literature 1 discloses a power supply control device for performing ON/OFF control of power supply to an information device such as a server housed in a rack. Moreover, Patent Literature 2 discloses a breaker in which a first actuator switches a switch from the closed state to the open state and a second actuator switches a switch from the closed state to the open state after receiving remote actuation signals. The breaker is the breaker of a circuit for supplying current from a power supply to a load.

However, in Patent Literature 1, a power supply control device needs to be newly added. This leads to cost increase. Moreover, the power supply control device needs to be constantly fed with power. Therefore, it cannot be said that Patent Literature 1 provides a solution to reduction in power consumption.

Moreover, the breaker disclosed in Patent Literature 2 requires, when apparatuses perform ON/OFF control one another using remote control lines, remote control lines the number of which is equal to the number of apparatuses connected to the circuit breakers of the apparatuses. As a result, the number of lines which is square the number of installed apparatuses is required. This means that addition and removal of apparatuses, for example are troublesome.

To solve such a problem, a power supply control system according to an embodiment of the present invention includes a first power supply switch device and a second power supply switch device each connected to a power supply. The first power supply switch device supplies power from the power supply to a first load. The first power supply switch device includes: a first main relay which switches between an ON state in which power is supplied from the power supply to the first load and an OFF state in which power is not supplied; a first sub relay provided in parallel with the first main relay, the first sub relay switching between the ON state in which power is supplied from the power supply to the first load and the OFF state in which power is not supplied, so as to prevent a rush current from flowing into the first load; and a first control unit which is connected to a first main control line for controlling the first main relay and a first sub control line for controlling the first sub relay, and driven by power supplied from the power supply via one of the first main relay and the first sub relay. The second power supply switch device supplies power from the power supply to a second load. The second power supply switch device includes: a second main relay which switches between an ON state in which power is supplied from the power supply to the second load and an OFF state in which power is not supplied; a second sub relay provided in parallel with the second main relay, the second sub relay switching between the ON state in which power is supplied from the power supply to the second load and the OFF state in which power is not supplied, so as to prevent a rush current from flowing into the second load; and a second control unit which is connected to a second main control line for controlling the second main relay and a second sub control line for controlling the second sub relay, and driven by power supplied from the power supply via one of the second main relay and the second sub relay. The power supply control system further includes a common control line connected to the first sub control line and the second sub control line. The first control unit further controls the second sub relay via the common control line.

Moreover, the second control unit further controls the first sub relay device via the common control line.

According to the above configuration, when one of the first and second power supply switch devices is in an operational state and the other is in a stopped state, even if the second control unit is not constantly fed with power, the second power supply switch device can be activated from the first control unit. As a result, a power supply control system which requires less power consumption can be achieved.

As an example, when the first main relay is in the ON state, the first control unit may be to set the second sub relay to the ON state for a predetermined time period via the common control line. The second control unit may be activated in response to a change of the second sub relay to the ON state, and set the second main relay to the ON state while the second sub relay is in the ON state.

Furthermore, the second control unit may obtain operation information indicating whether or not the second load should operate at this point, and set the second main relay to the OFF state when the operation information indicates that the second load should not operate According to this configuration, the second control unit can determine whether or not each control unit should operate at this point based on the operation information once all the power supply switch devices are activated. This allows only the desired power supply switch device to be activated with simple configuration.

The power supply control system may further include a start-up circuit connected to the common control line, and being for controlling the first sub relay and the second sub relay. According to this configuration, a desired power supply switch device can be activated even if all the power supply switch devices are in a stopped state. It should be noted that the start-up circuits may be included in at least one of the first and second power supply switch devices, or may be separately provided from the first and second power supply switch devices and directly connected to the common control line.

A power supply control system according to another embodiment of the present invention includes a first power supply switch device and a second power supply switch device each connected to a power supply. The first device includes: a first load to be driven by power supplied from the power supply; a first main relay which switches between an ON state in which power is supplied from the power supply to the first load and an OFF state in which power is not supplied; a first sub relay provided in parallel with the first main relay, the first sub relay switching between the ON state in which power is supplied from the power supply to the first load and the OFF state in which power is not supplied, so as to prevent a rush current from flowing into the first load; and a first control unit connected to a first main control line for controlling the first main relay and a first sub control line for controlling the first sub relay, and configured to be driven by power supplied from the power supply via one of the first main relay and the first sub relay. The second device includes: a second load to be driven by power supplied from the power supply, a second main relay which switches between an ON state in which power is supplied from the power supply to the second load and an OFF state in which power is not supplied; a second sub relay provided in parallel with the second main relay, the second sub relay switching between the ON state in which power is supplied from the power supply to the second load and the OFF state in which power is not supplied, so as to prevent a rush current from flowing into the second load; and a second control unit connected to a second main control line for controlling the second main relay and a second sub control line for controlling the second sub relay, and configured to be driven by power supplied from the power supply via one of the second main relay and the second sub relay. The power supply control system further comprises a common control line connected to the first sub control line and the second sub control line. The first control unit further controls the second sub relay via the common control line. Moreover, the second control unit further controls the first sub relay via the common control line.

The first load and the second load may be storage batteries for storing power supplied from the power supply.

With reference to the drawings, the following specifically describes a power supply control system according to an aspect of the present invention. It should be noted that each of the exemplary embodiments described below shows a general or specific example. The numerical values, shapes, materials, structural elements, the arrangement and connection of the structural elements, steps, the processing order of the steps and so on shown in the following exemplary embodiments are mere examples, and therefore do not limit the scope of the appended Claims and their equivalents. Therefore, among the structural elements in the following exemplary embodiments, structural elements not recited in any one of the independent claims are described as arbitrary structural elements for a preferable embodiment.

[Embodiment 1]

Figure 1:
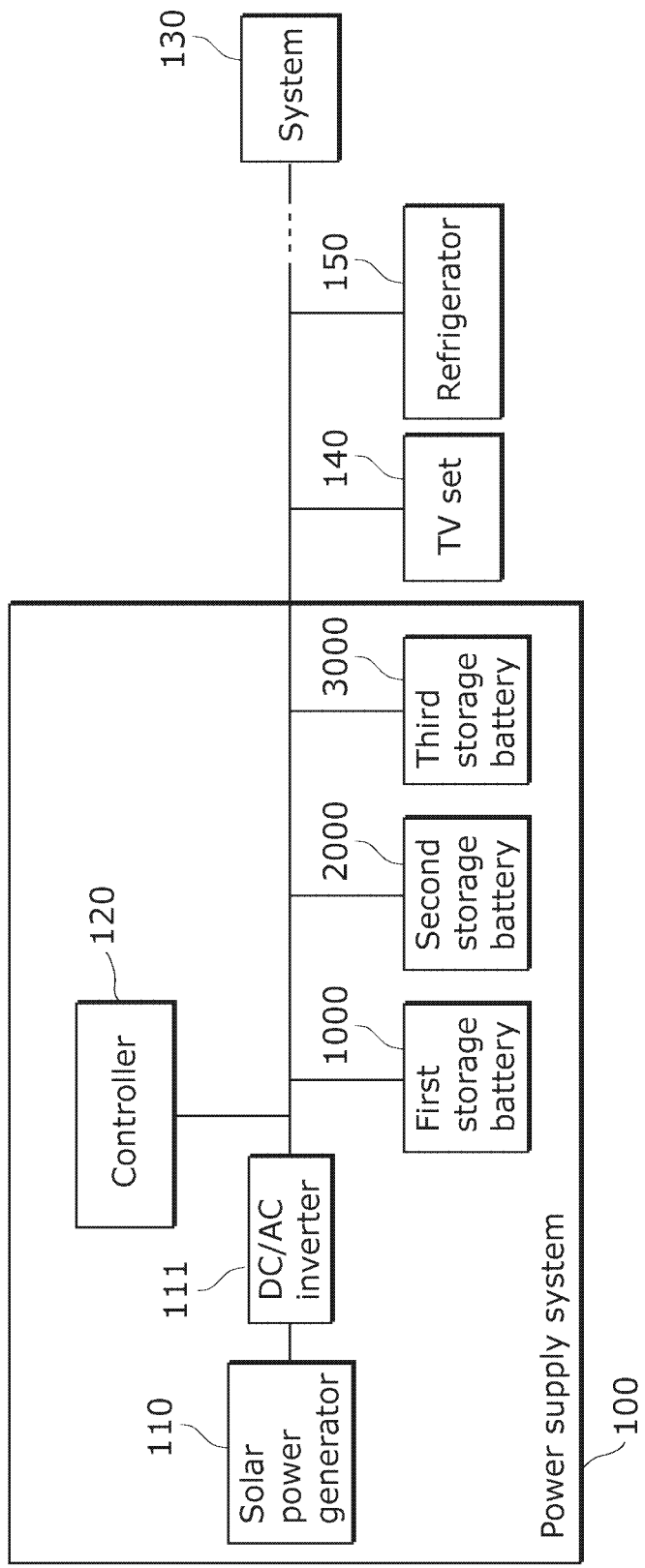
FIG. 1 schematically illustrates a configuration of a whole power supply system according to the first embodiment.

FIG. 1 schematically illustrates a configuration of a whole power supply system including a power supply control system according to the first embodiment of the present invention. As shown in FIG. 1, a power supply system 100 includes a solar power generator 110 for generating power from sunlight, a DC/AC inverter 111 for converting power generated by the solar power generator 110 from direct current to alternating current, a controller 120 for controlling the power supply system 100, and several (three in FIG. 1) electrical storage devices 1000, 2000, and 3000. It should be noted that the power supply system 100 may include a power generator such as a fuel cell instead of the solar power generator 110.

Moreover, the power supply system 100 can be supplied with power from a system 130. Moreover, a TV set 140 and a refrigerator 150 are connected to the power supply system 100. The TV set 140 and the refrigerator 150 operate with power generated in the solar power generator 110, power stored in the electrical storage devices 1000, 2000, and 3000, or power supplied from the system 130. It should be noted that in addition to the TV set 140 and the refrigerator 150, any devices (loads) to be driven by supplied power can be connected to the power supply system 100.

It should be noted that the DC/AC inverter 111 may be positioned closer to the system 130 than to the electrical storage devices 1000, 2000, and 3000, or may be outside of the power supply system 100. In this case, the solar power generator 110, the controller 120 for controlling the power supply system 100, and the electrical storage devices 1000, 2000, and 3000 are connected by alternating current.

Figure 2:
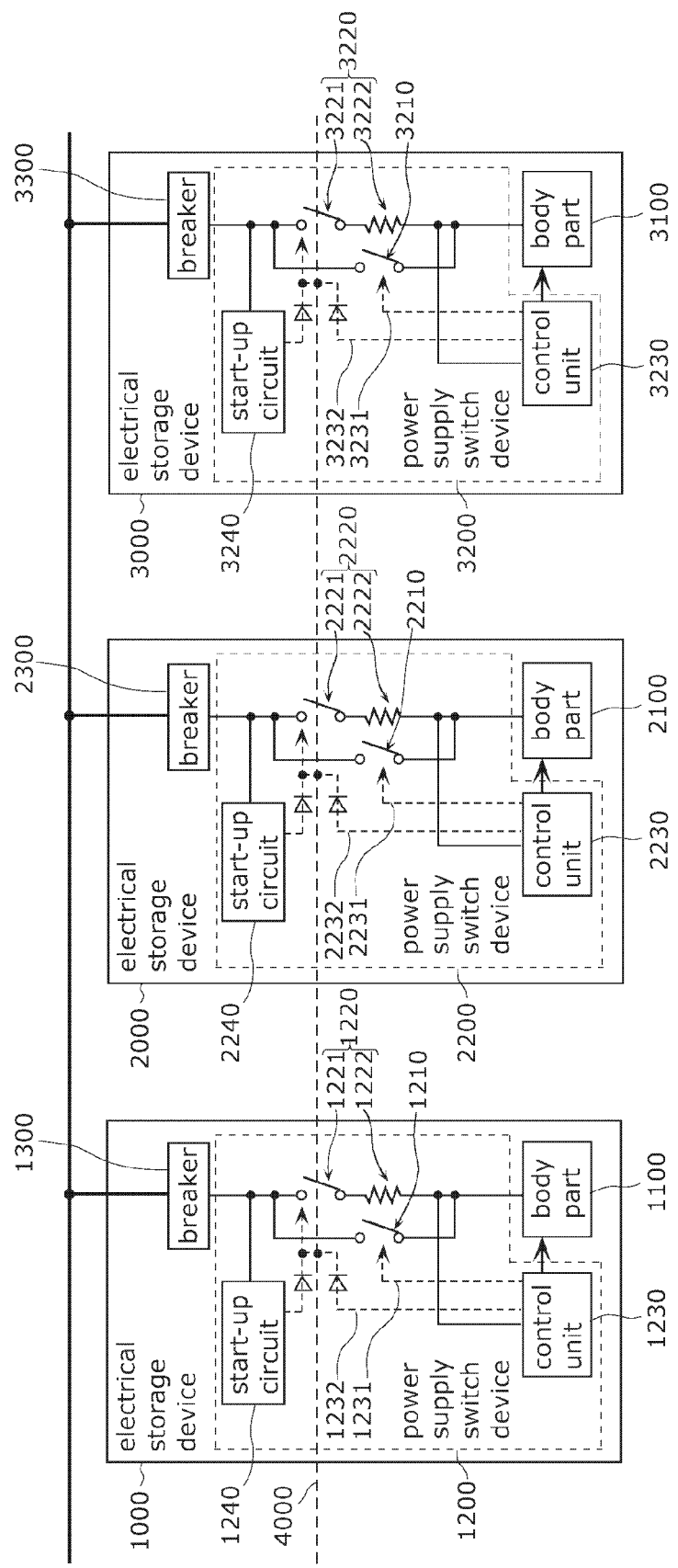
FIG. 2 illustrates a configuration of a power supply control system according to the first embodiment.

In accordance with control by the controller 120, the electrical storage devices 1000, 2000, and 3000 store power mainly generated in the solar power generator 110, and supply the power to the TV set 140 and the refrigerator 150. FIG. 2 illustrates a detailed configuration of the electrical storage devices 1000, 2000, and 3000.

As shown in FIG. 2, the electrical storage device 1000 includes a body part 1100, a power supply switch device 1200, and a breaker 1300. Moreover, the power supply switch device 1200 includes a main relay 1210, a sub relay 1220, a control unit 1230, and a start-up circuit 1240. It should be noted that the electrical storage device 1000 does not have to include the breaker 1300.

A power supply control system according to an embodiment of the present invention includes power supply switch devices 1200, 2200, and 3200 connected in parallel with respect to a power supply (solar power generator 110 and/or system 130) and a common control line 4000 for connecting between the power supply switch devices 1200, 2200, and 3200. Moreover, the power supply control system may include body parts 1100, 2100, and 3110 as its elements.

The body part 1100 is driven by power supplied from the power supply via the power supply switch device 1200. In the present embodiment, the body part 1100 is a storage battery (not shown in FIG. 2). However, a specific example of the body part 1100 is not limited to this, but the body part 1100 may be any device (load) to be driven by power supplied from the power supply.

It should be noted that the charging body part 1100 operates as a load of the solar power generator 110 and the system 130. On the other hand, the discharging body part 1100 operates as a power supply for the TV set 140 and the refrigerator 150. It should be noted that the discharging body part 1100 may supply power to the system 130. The power supply control system according to the present embodiment mainly obtains advantageous effects when the body part 1100 operates as a load.

The power supply switch device 1200 supplies power from the power supply to the body part 1100. Moreover, when the body part 1100 is a storage battery, power stored in the storage battery is supplied to the TV set 140 and the refrigerator 150 which are connected to the power supply system 100.

The main relay 1210 and the sub relay 1220 are connected in parallel on the path from the power supply to the body part 1100. In accordance with control by the control unit 1230, the main relay 1210 and the sub relay 1220 switch between (i) a state (ON state) in which power is supplied from the power supply to the body part 1100 and (ii) a state (OFF state) in which power is not supplied.

It should be noted that the sub relay 1220 is different from the main relay 1210 in that a switch 1221 and a resistor 1222 are connected in series on the way from the power supply to the body part 1100 on the line. Thus, a current that flows from the power supply into the body part 1100 via the sub relay 1220 is smaller than a current that flows into the body part 1100 via the main relay 1210. Therefore, the sub relay 1220 is used as a rush-prevention relay for preventing a rush current from flowing from the power supply into the body part 1100.

The control unit 1230 operates with power supplied from the power supply via at least one of the main relay 1210 and the sub relay 1220, and controls the state of the main relay 1210 and the sub relay 1220. It should be noted that the control unit 1230 may only control the elements of the power supply switch device 1200. The control unit 1230 may further include a function to control the operation of the body part 1100.

More specifically, the control unit 1230 switches the ON/OFF state of the main relay 1210 connected to the control unit 1230 via a main control line 1231. Moreover, the control unit 1230 switches the ON/OFF state of the sub relay 1220 connected to the control unit 1230 via a sub control line 1232. Moreover, the control unit 1230 switches the ON/OFF state of sub relays 2220 and 3220 in the other power supply switch devices 2200 and 3200 which are connected to the control unit 1230 via the sub control line 1232 and the common control line 4000.

Here, the main relay 1210 and the sub relay 1220 are electrically interposed between the power supply and the control unit 1230. That is, only when at least one of the main relay 1210 and the sub relay 1220 is in the ON state, the control unit 1230 is supplied with power and can operate. In other words, when both the main relay 1210 and the sub relay 1220 are in the OFF state, power is not supplied to the control unit 1230.

Figure 3:
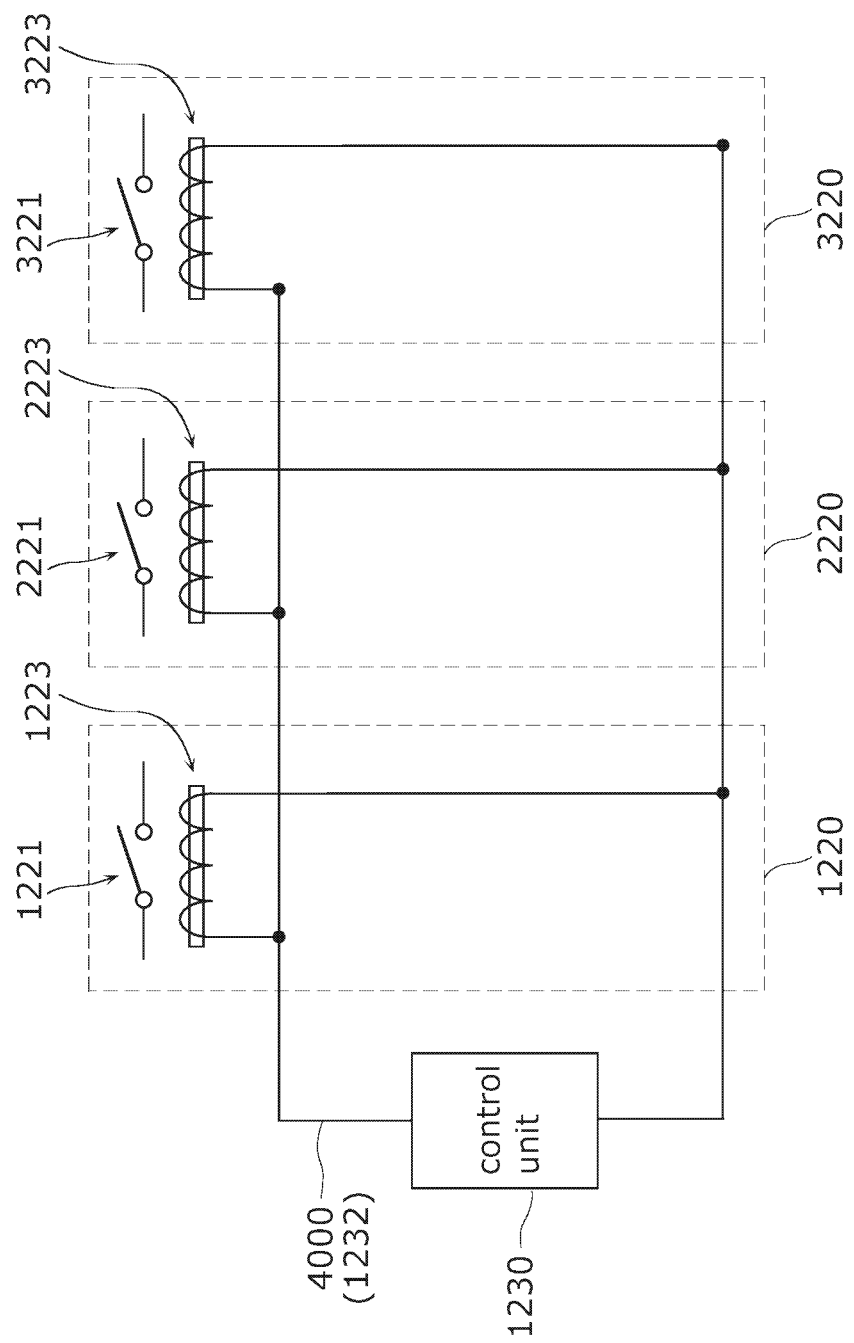
FIG. 3 illustrates a detailed configuration of a sub relay.

With reference to FIG. 3, the following describes a detailed configuration for allowing the control unit 1230 to control, via the sub control line 1232 and the common control line 4000, the sub relays 1220, 2220, and 3220 in the power supply switch devices 1200, 2200, and 3200, respectively. It should be noted that since control units 2230 and 3230 have the same configuration as above, figures and explanation will be omitted here.

The sub relays 1220, 2220, and 3220 include electromagnetic coils 1223, 2223, and 3223 for switching the ON/OFF state of respective switches 1221, 2221, and 3221. It should be noted that in FIG. 3, resistors 1222, 2222, and 3222 are not shown.

The control unit 1230 controls the sub relays 1220, 2220, and 3220 by outputting a rush-prevention relay ON signal (e.g., a voltage of 5V) to the sub control line 1232 and the common control line 4000.

Specifically, the control unit 1230 switches the switches 1221, 2221, and 3221 ON by the principle of electromagnetic induction by inputting a voltage of 5V to the electromagnetic coils 1223, 2223, and 3223. That is, the sub relays 1220, 2220, and 3220 are in the ON state only while the control unit 1230 is inputting a voltage of 5V, and at the other time, the sub relays 1220, 2220, and 3220 are in the OFF state.

The start-up circuit 1240 is a circuit for controlling the state of the sub relay 1220, and is typically a manual switch. Moreover, the start-up circuit 1240 not only controls the sub relay 1220, but also controls the state of the sub relays 2220 and 3220 in the other power supply switch devices 2200 and 3200 via the common control line 4000.

The breaker 1300 is a main switch for controlling whether or not power from the power supply is supplied to the power supply switch device 1200. This breaker 1300 is typically a manual switch switched by a user. However, without being limited to this, the breaker 1300 may be a switch which can by electrically switched by the controller 120, for example.

The common control line 4000 are connected, via sub control lines 1232, 2232, and 3232, to the control units 1230, 2230, and 3230 in the power supply switch devices 1200, 2200, and 3200. Moreover, the common control line 4000 is connected to start-up circuits 1240, 2240, and 3240 in the power supply switch devices 1200, 2200, and 3200. Moreover, to prevent rush-prevention relay ON signals from flowing backward, diodes are provided between the common control line 4000 and each of the control units 1230, 2230, and 3230 and between the common control line 4000 and each of the start-up circuits 1240, 2240, and 3240.

The common control line 4000 transmits, to all of the sub relays 1220, 2220, and 3220, rush-prevention relay ON signals outputted from the control units 1230, 2230, and 3230 or from the start-up circuits 1240, 2240, and 3240. That is, in a power supply control system in the present embodiment, the state (ON/OFF state) of all the sub relays 1220, 2220 and 3220 is switched at the same time.

Moreover, as it is for the electrical storage device 1000, the electrical storage device 2000 includes a body part 2100, a power supply switch device 2200, and a breaker 2300. As it is for the electrical storage device 1000, the electrical storage device 3000 includes a body part 3100, a power supply switch device 3200, and a breaker 3300. Furthermore, as it is for the power supply switch device 1200, the power supply switch device 2200 includes a main relay 2210, a sub relay 2220, a control unit 2230, and a start-up circuit 2240. As it is for the power supply switch device 1200, the power supply switch device 3200 includes a main relay 3210, a sub relay 3220, a control unit 3230, and a start-up circuit 3240. It should be noted that the elements of the electrical storage devices 2000 and 3000 correspond to the elements of the electrical storage device 1000. Therefore, the explanation will be omitted here.

Figure 4:
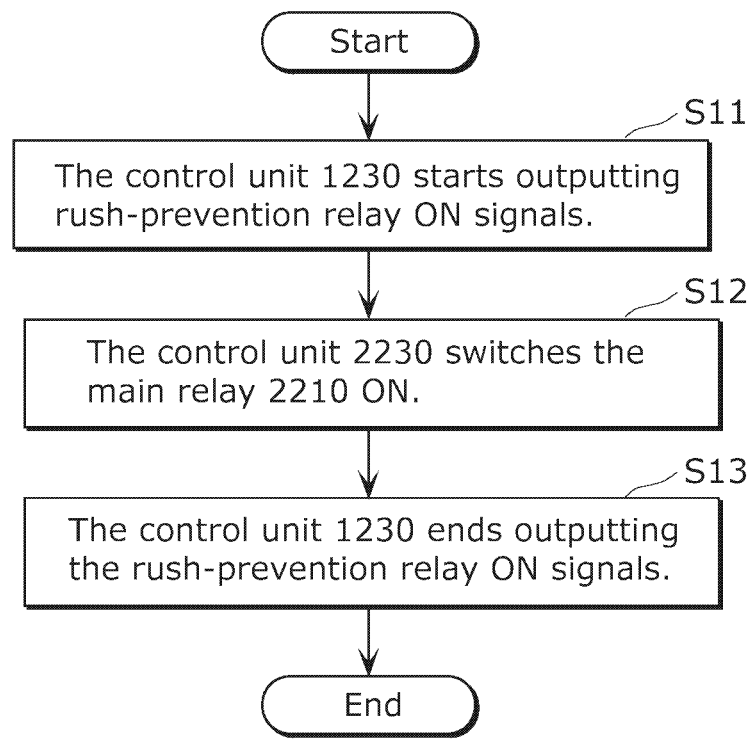
FIG. 4 illustrates an example of a flowchart illustrating the operation of a power supply control system.
Figure 5:
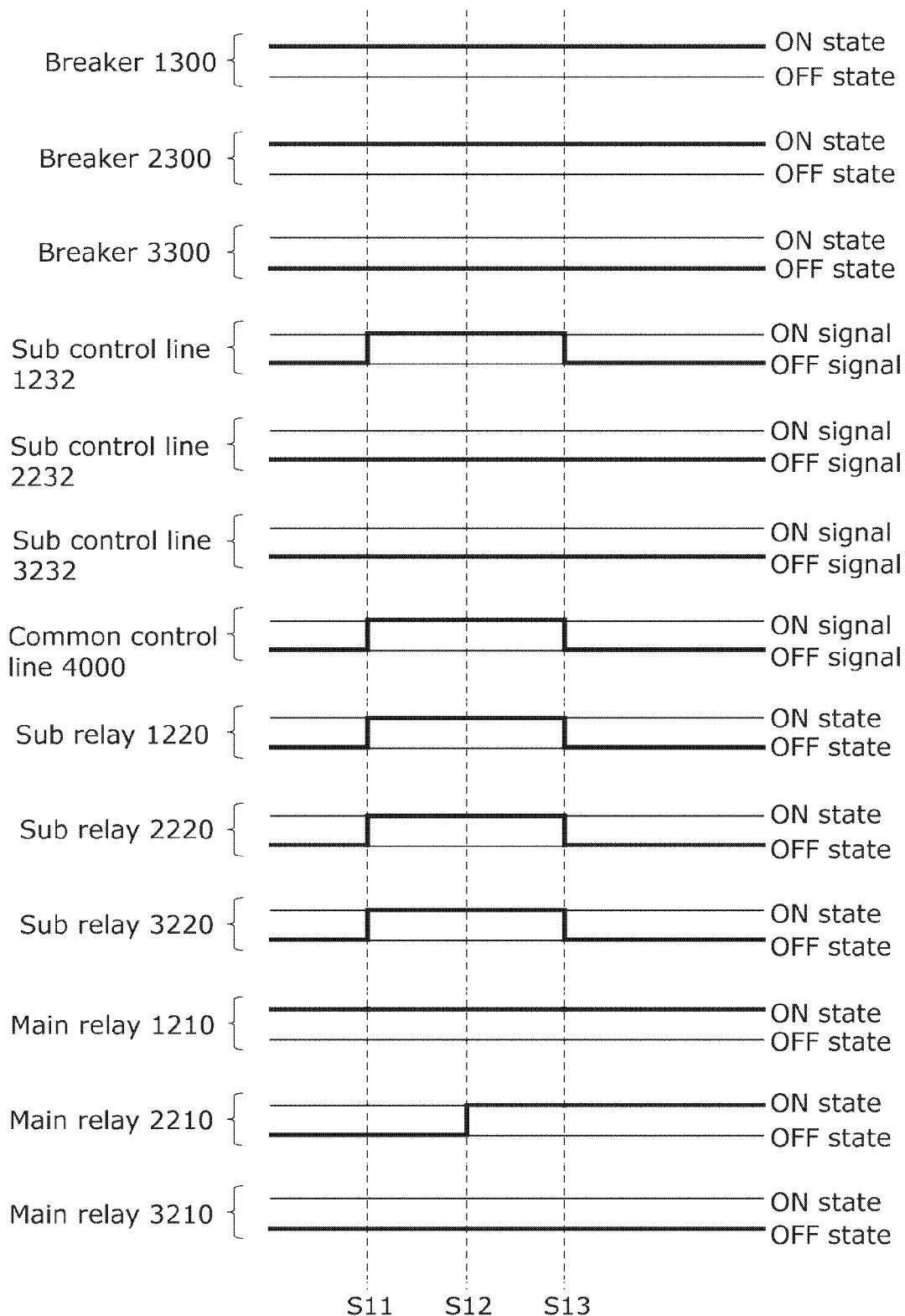
FIG. 5 illustrates an example of operating state of the elements of a power supply control system.

With reference to FIGS. 4 and 5, the following describes an example of the operation of a power supply control system configured as above. FIG. 4 is a flowchart of the operation of the power supply control system. FIG. 5 illustrates operating state of the elements of the power supply control system.

It should be noted that an operation example shown in FIGS. 4 and 5 is an example when the control unit 1230 activates the electrical storage device 2000 on an assumption that the breakers 1300 and 2300 and the main relay 1210 are in the ON state, and the breaker 3300, the main relays 2210 and 3210, and the sub relays 1220, 2220, and 3220 are in the OFF state.

The control unit 1230 starts outputting rush-prevention relay ON signals, i.e., starts applying a voltage of 5V to the sub control line 1232 and the common control line 4000 (S11). This switches the sub relays 1220, 2220, and 3220 ON. As a result, the body part 2100 and the control unit 2230 are supplied with power from the power supply via the sub relay 2220, thus activating the body part 2100 and the control unit 2230. Meanwhile, since the breaker 3300 is in the OFF state, the body part 3100 and the control unit 3230 are not supplied with power and remain in a standby state (stopped state).

The control unit 2230 switches the main relay 2210 ON via a main control line 2231 (S12). The timing at which the main relay 2210 is switched ON is after the amount of current which flows from the power supply to the body part 2100 via the sub relay 2220 stabilizes (rush current subsides) and before the output of rush-prevention relay ON signals from the control unit 1230 ends.

The control unit 1230 ends the output of the rush-prevention relay ON signals, i.e., ends the application of a voltage of 5V (S13). This switches the sub relays 1220, 2220, and 3220 OFF.

Executing the procedure allows the activation of the electrical storage device 2000 from the control unit 1230 in an operational state even if the control unit 2230 in a standby state is not constantly fed with power. As a result, a power supply control system which requires less power consumption can be achieved.

Moreover, the power supply switch devices 1200, 2200, and 3200 in the power supply control system can control power supply to the power supply switch devices 1200, 2200, and 3200, respectively. The effect can be obtained only by connecting between the power supply switch devices 1200, 2200, and 3200 via the common control line 4000. That is, to control other power supply switch devices, a special function does not have to be given to or new information does not have to be stored by the control units 1230, 2230, and 3230. As a result, when adding a new power supply switch device to the power supply control system, the power supply switch device only has to be connected to the common control line 4000. When removing an existing power supply switch device, the power supply switch device only has to be disconnected from the common control line 4000, and other troublesome jobs are unnecessary.

It should be noted that the control is, for example, performed at the timing when the electrical storage device 1000 is being charged with power generated in the solar power generator 110, the electrical storage device 1000 becomes closer to full charge, and a device to be charged is switched from the electrical storage device 1000 to the electrical storage device 2000. Alternatively, the control is performed in the case where power is also supplied from the electrical storage device 2000 when power cannot be sufficiently supplied to loads (TV set 140 and refrigerator 150) only from the electrical storage device 1000.

Figure 6:
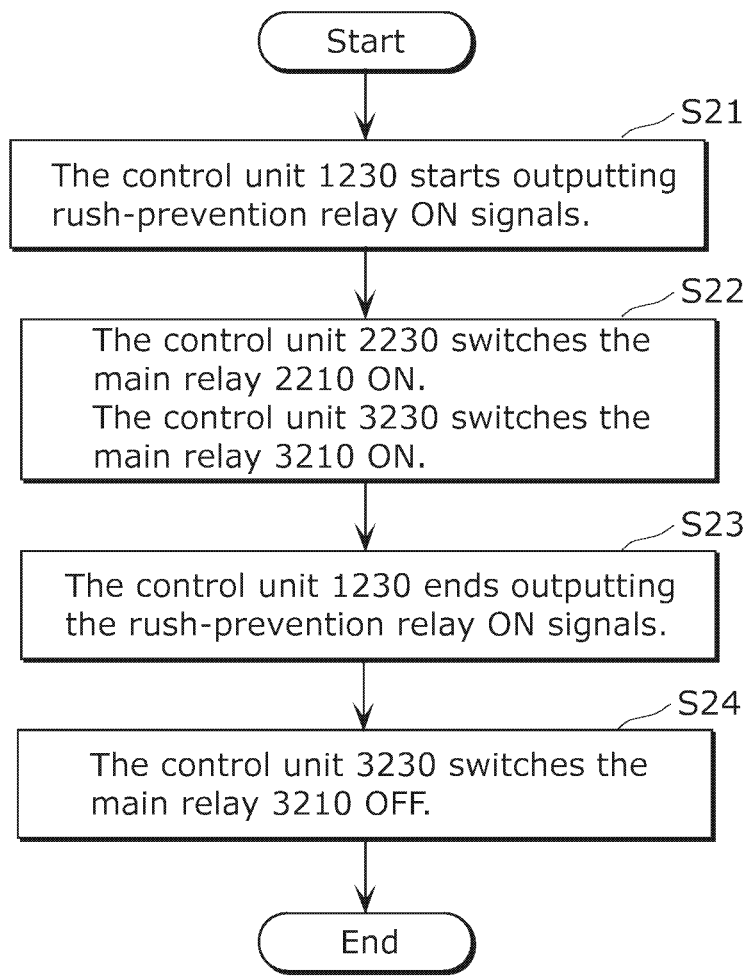
FIG. 6 illustrates another example of a flowchart illustrating the operation of a power supply control system.
Figure 7:
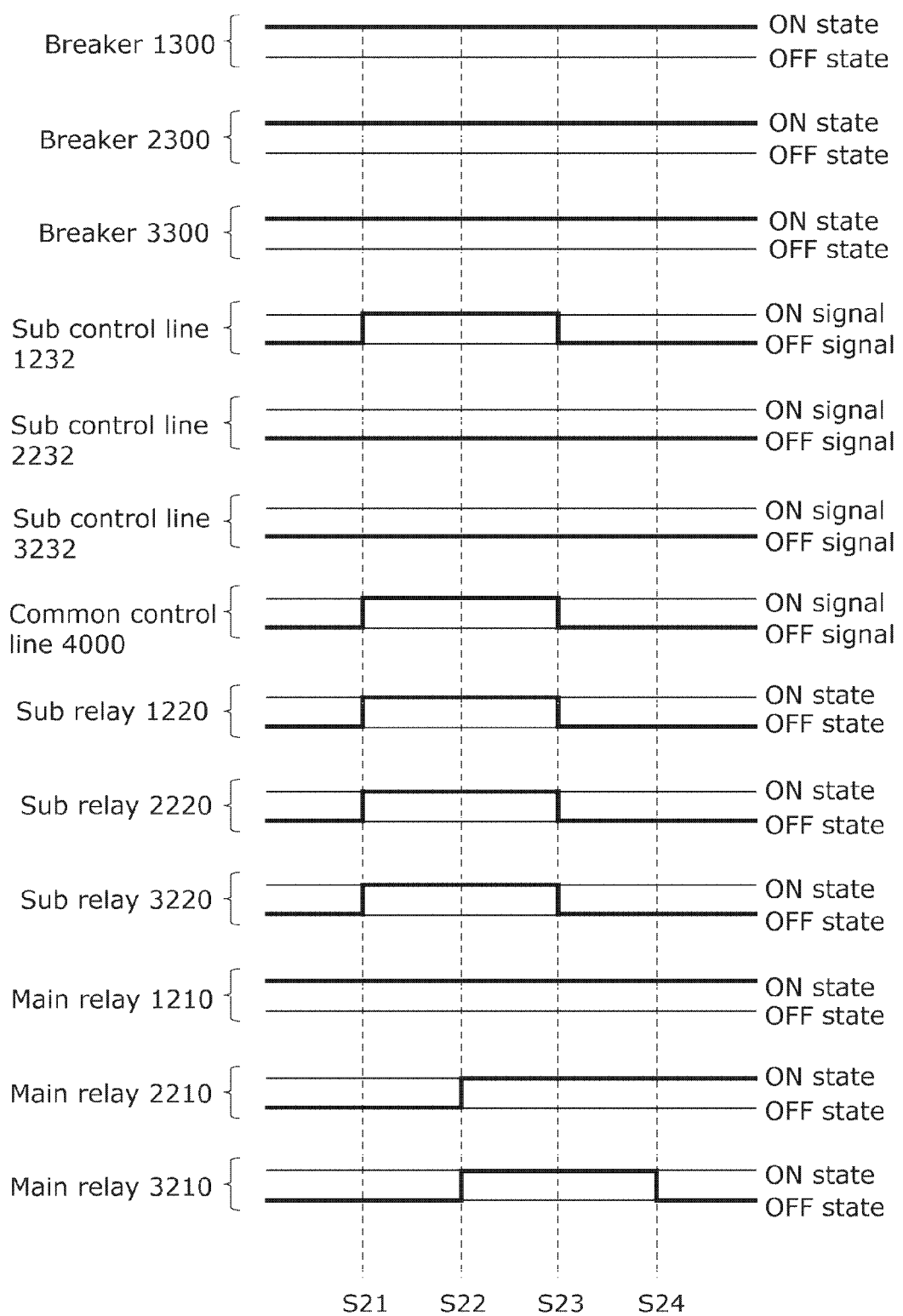
FIG. 7 illustrates another example of operating state of the elements of a power supply control system.

With reference to FIGS. 6 and 7, the following describes another example of the operation of a power supply control system configured as above. FIG. 6 is a flowchart of the operation of the power supply control system. FIG. 7 illustrates operating state of the elements of the power supply control system. It should be noted that detailed explanation of common points with FIGS. 4 and 5 will be omitted here, and different points will be focused.

It should be noted that an assumption of the operation example shown in FIGS. 6 and 7 is different from that of the operation example shown in FIGS. 4 and 5 in that the breaker 3300 is in the ON state. However, other points are the same.

The control unit 1230 starts outputting rush-prevention relay ON signals, i.e., starts applying a voltage of 5V to the sub control line 1232 and the common control line 4000 (S21). The control units 2230 and 3230 switch the main relays 2210 and 3210 ON via main control lines 2231 and 3231 (S22). The control unit 1230 ends the output of the rush-prevention relay ON signals, i.e., ends the application of a voltage of 5V (S23).

The operation from S21 to S23 is the same as the operation from S11 to S13 which is shown in FIG. 4. However, the difference is in that since the breaker 3300 is in the ON state, the control unit 3230 of the power supply switch device 3200 is activated and the main relay 3210 is switched ON.

The control units 1230, 2230, and 3230 obtain, from the controller 120, operation information indicating whether or not the body parts 1100, 2100, and 3100 respectively controlled by control units 1230, 2230, and 3230 should operate at this point, and control the main relays 1210, 2210, and 3210 based on this operation information (S24). It should be noted that the execution order of S23 and S24 may be reversed.

For example, when the operation information obtained by the control units 1230, 2230, and 3230 indicates "operational state" for the body parts 1100 and 2100 and "stopped state" for the body part 3100, the control units 1230 and 2230 maintain the main relays 1210 and 2210 in the ON state, and the control unit 3230 switches the main relay 3210 OFF, as shown in FIG. 7.

It should be noted that although there is no particular limitation to information contained in the operation information, the information may indicate operation schedules of the body parts 1100, 2100, and 3100, for example. Moreover, timing when the operation information is obtained is not limited to a particular time. The operation information may be obtained every midnight, or obtained at the timing when the control units 1230, 2230, and 3230 are activated. Moreover, the operation information is not only obtained by the controller 120, but also may be obtained by other units which a user directly sets for the control units 1230, 2230, and 3230.

All the sub relays 1220, 2200, and 3200 are connected by the common control line 4000 in the power supply control system shown in FIG. 2. Therefore, in the operation example shown in FIGS. 4 and 5, the breaker 2300 of the electrical storage device 2000 that should be activated needs to be preset to the ON state and the breaker 3300 of the electrical storage device 3000 that should not be activated needs to be preset to the OFF state.

Meanwhile, in an operation example shown in FIGS. 6 and 7, the control units 1230, 2230, and 3230 each determine the need of its operation based on the operation information. Therefore, the breakers 1300, 2300, and 3300 can be constantly in the ON state. As a result, in addition to the above effect, another effect can be expected that troublesome jobs such as manually switching the state of breakers 1300, 2300, and 3300 by the user are unnecessary.

Figure 8:
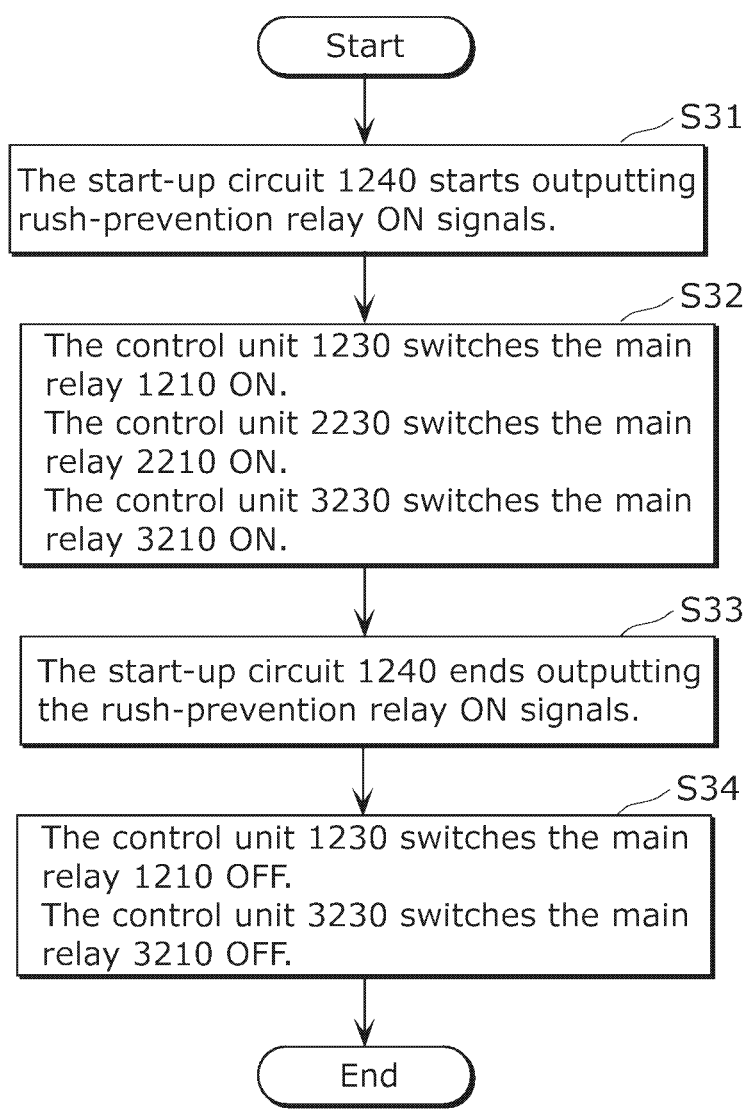
FIG. 8 illustrates another example of a flowchart illustrating the operation of a power supply control system.
Figure 9:
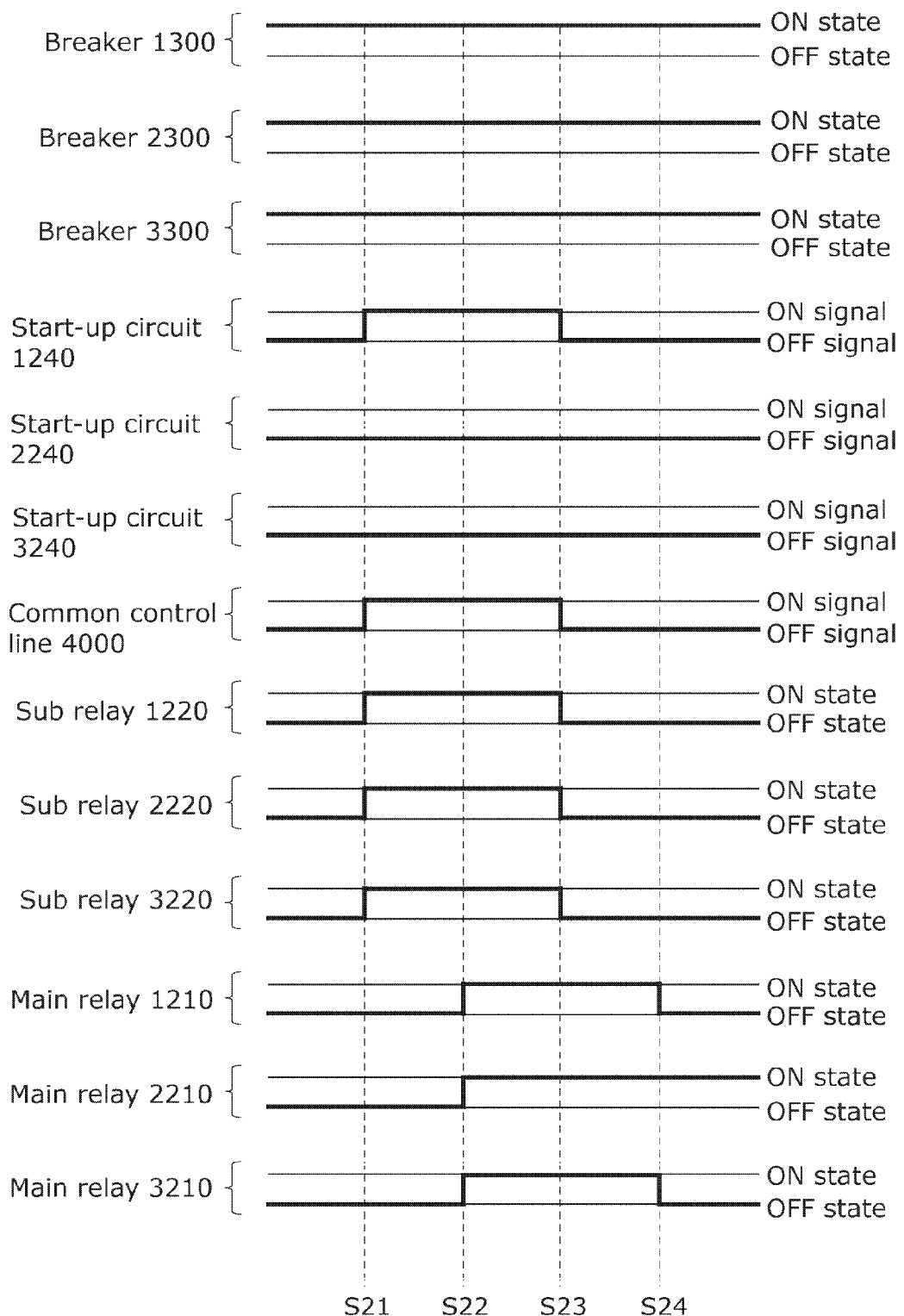
FIG. 9 illustrates another example of operating state of the elements of a power supply control system.

With reference to FIGS. 8 and 9, the following describes another example of the operation of a power supply control system configured as above. FIG. 8 is a flowchart of the operation of the power supply control system. FIG. 9 illustrates operating state of the elements of the power supply control system. It should be noted that detailed explanation of common points with FIGS. 6 and 7 will be omitted here, and different points will be focused.

It should be noted that an assumption of the operation example shown in FIGS. 8 and 9 is different from that of the operation example shown in FIGS. 6 and 7 in that the main relay 1210 is in the OFF state, i.e., all the electrical storage devices 1000, 2000, and 3000 are in a stopped state. The other points are the same.

The start-up circuit 1240 starts outputting rush-prevention relay ON signals, i.e., starts applying a voltage of 5V to the common control line 4000 (S31). This switches all the sub relays 1220, 2220, and 3220 ON. When being supplied with power from the power supply via the sub relays 1220, 2220, and 3220, all the control units 1230, 2230, and 3230 are activated.

The control units 1230, 2230, and 3230 switch the main relay 1210, 2210, and 3210 ON via the main control lines 1231, 2231, and 3231, respectively (S32). The start-up circuit 1240 ends the output of the rush-prevention relay ON signals, i.e., ends the application of a voltage of 5V (S33).

The control units 1230, 2230, and 3230 obtain, from the controller 120, operation information indicating whether or not the body parts 1100, 2100, and 3100 respectively controlled by control units 1230, 2230, and 3230 should operate at this point, and control the main relays 1210, 2210, and 3210 based on this operation information (S34). It should be noted that the execution order of S23 and S24 may be reversed.

For example, when the operation information obtained by the control units 1230, 2230, and 3230 indicates "stopped state" for the body parts 1100 and 3100 and "operational state" for the body part 2100, the control unit 2230 maintain the main relay 2210 in the ON state, and the control units 1230 and 3210 switch the main relays 1210 and 3210 OFF, respectively, as shown in FIG. 9.

Thus, by providing the start-up circuits 1240, 2240, and 3240 to the power supply switch devices 1200, 2200, and 3200, respectively, a desired storage device (electrical storage device 2000 in this example) can be activated even if all the electrical storage devices 1000, 2000, and 3000 are in a stopped state.

It should be noted that FIG. 2 illustrates an example in which all the power supply switch devices 1200, 2200, and 3200 are provided with the start-up circuits 1240, 2240, and 3240. However, without being limited to this example, not all but only one or some of the power supply switch devices may include a start-up circuit.

[Embodiment 2]

Figure 10:
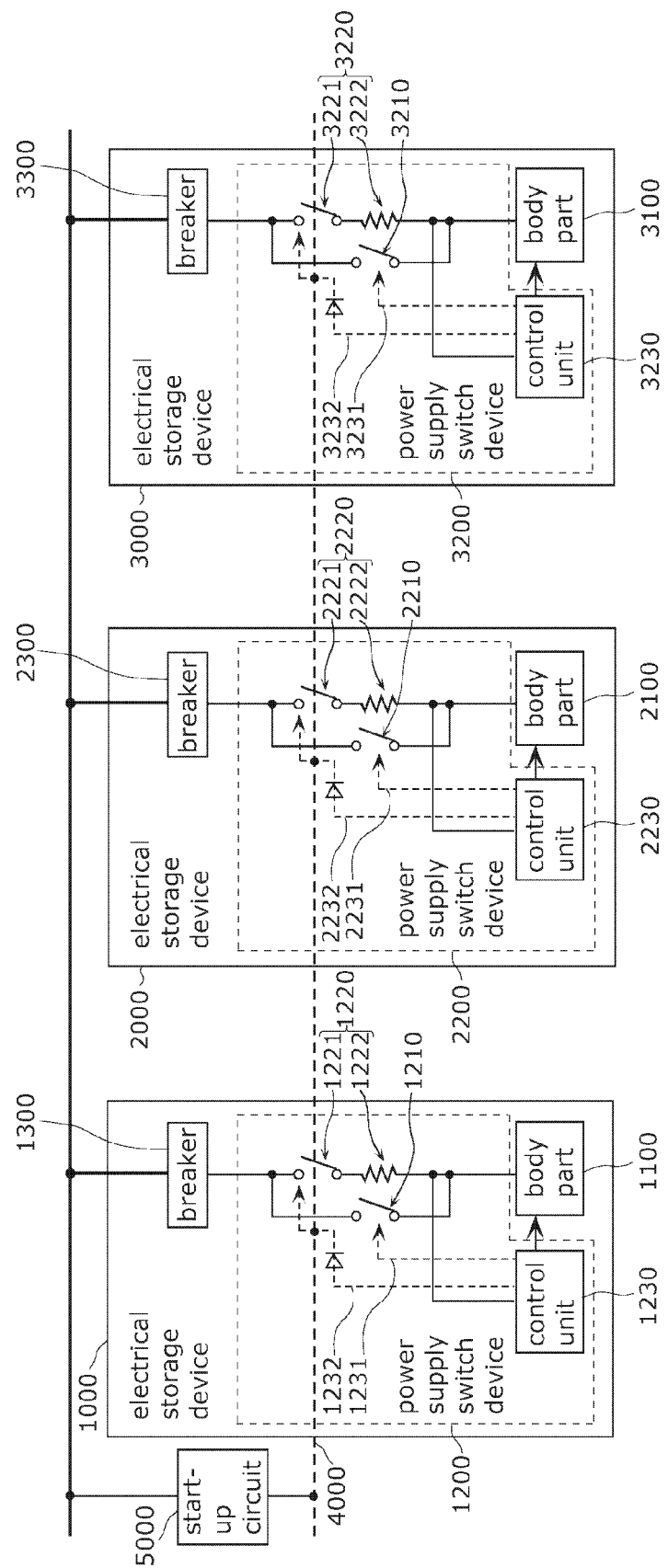
FIG. 10 illustrates a configuration of a power supply control system according to the second embodiment.

With reference to FIG. 10, the following describes a power supply control system according to the second embodiment. FIG. 10 is a block diagram of the power supply control system according to the second embodiment. It should be noted that the same reference numbers are given to the same elements as those shown in FIG. 2, and the explanation will be omitted here.

The power supply switch devices 1200, 2200, and 3200 according to the second embodiment are different from those in the first embodiment in that the start-up circuits 1240, 2240, and 3240 are not provided. Meanwhile, the power supply control system according to the second embodiment includes a start-up circuit 5000 arranged independently from the electrical storage devices 1000, 2000, and 3000 and connected to the common control line 4000. It should be noted that the start-up circuit 5000 has the same configuration and function as those of the start-up circuits 1240, 2240, and 3240. Therefore, the explanation will be omitted here.

As it is for the operation example shown in FIGS. 8 and 9, in the power supply control system configured as above, a desired storage device can be activated even if all the electrical storage devices 1000, 2000, and 3000 are in a stopped state. It should be noted that the arrangement of the start-up circuit 5000 is not limited to the example shown in FIG. 10. However, the start-up circuit 5000 may be included in the controller 120, for example.

The first and second embodiments exemplify a power supply control system including more than one storage device (or power supply switch devices included in storage devices). However, a power supply control system according to the present invention is not limited this example. As an example, the present invention is applicable when a power supply control system includes several servers and an active server is switched from a main server to a backup server. As another example, the present invention is applicable when the power supply control system includes a TV set and a playback device, and the playback device switches the TV set ON at the timing when the playback device starts playing back content.

[Other Embodiment]

Specifically, the control units 1230, 2230, and 3230 are computer systems including a microprocessor, a ROM, a RAM, a hard disk unit, a display unit, a keyboard, and a mouse. A computer program is recorded in the RAM or the hard disk unit. When the microprocessor operates in accordance with the computer program, the control units 1230, 2230, and 3230 each achieve its function.

Here, the computer program is configured by combining several instruction codes indicating instructions to a computer to achieve predetermined functions. It should be noted that each device is not limited to a computer system including all of a microprocessor, a ROM, a RAM, a hard disk unit, a display unit, a keyboard, a mouse, and others, but may be a computer system including some of them.

A part or all of the structural elements constituting the respective devices may be a single System-LSI (Large-Scale Integration). The System-LSI is a super-multi-function LSI manufactured by integrating constituent units on one chip, and is specifically a computer system including a microprocessor, a ROM, a RAM, and so on. A computer program is stored in the RAM. The System-LSI achieves its function through microprocessor's operation in accordance with the computer program. Moreover, each of the structural elements included in the respective devices may be made as separate individual chips or as a single chip to include a part or all thereof. Moreover, although the System-LSI is described here, the system may be called IC, LSI, super LSI, or ultra LSI according to differences in the degree of integration. Moreover, the means for circuit integration is not limited to an LSI, but it may be implemented with a dedicated circuit or a general-purpose processor. A field programmable gate array (FPGA) that is programmable after the manufacture of the LSI, and a reconfigurable processor which can reconfigure connections and settings of circuit cells within the LSI may be used. Furthermore, if progress in the semiconductor technology or another derived technology brings an integrated circuit technology that will replace LSI, then of course, functional blocks may be integrated using that technology. Application of the biotechnology is a possible example.

The control units 1230, 2230, and 3230 may include an IC card or a single module which is attachable to and detachable from the power supply switch devices 1200, 2200, and 3200. The IC card or the module is a computer system including a microprocessor, a ROM, and a RAM. The IC card or the module may include the super-multi-function LSI described above. The IC card or the module achieves its function through microprocessor's operation in accordance with a computer program. The IC card or the module may have tamper-resistant characteristics.

The present invention may be the method described above. Moreover, the present invention may be a computer program which achieves these methods by a computer or may be digital signals including the computer program. Moreover, in the present invention, a computer program or digital signals may be stored in a computer readable medium such as a flexible disc, a hard disc, a CD-ROM, a MO, a DVD, a DVD-ROM, a DVD-RAM, a Blu-ray disc (BD), or a semiconductor memory. Moreover, the present invention may be digital signals stored in these recording media. Moreover, the present invention may transmit a computer program or digital signals via a telecommunication line, a wireless or wired communication line, a network represented by the Internet, and data broadcasting, for example. Moreover, the present invention may be a computer system including a microprocessor and a memory. Here, the memory may store the computer program, and the microprocessor may operate in accordance with the computer program. Furthermore, the present invention may be performed by another independent computer system by transferring the program or digital signals stored in a recording medium or transferring the program or digital signals via a network or the like.

Although the embodiments of the present invention were described above with reference to the drawings, the present invention is not limited to the embodiments shown in the drawings. Various modifications and variations can be made to the embodiments shown in the drawings within the scope of the present invention or within the equivalents of the present invention.

INDUSTRIAL APPLICABILITY

The present invention is advantageously used for a power supply control system in which devices connected in parallel with respect to a power supply control ON/OFF of the power supply one another.

REFERENCE SIGNS LIST 10 power supply control system
20, 30, 40 electrical apparatuses
21, 1100, 2100, 3100 body part
22, 32, 42, 1200, 2200, 3200 power supply switch device
23, 1300, 2300, 3300 breaker
24, 1210, 2210, 3210 main relay
25 rush-prevention relay
26, 1230, 2230, 3230 control unit
100 power supply system
110 solar power generator 110
111 DC/AC inverter
120 controller
130 system
140 TV set
150 refrigerator
1000, 2000, 3000 storage device
1220, 2220, 3220 sub relay
1221, 2221, 3221 switch
1222, 2222, 3222 resistor
1223, 2223, 3223 electromagnetic coil
1231, 2231, 3231 main control line
1232, 2232, 3232 sub control line
1240, 2240, 3240, 5000 start-up circuit
4000 common control line

The invention claimed is:

1. A power supply control system comprising
a first power supply switch device and a second power supply switch device each connected to a power supply,
wherein the first power supply switch device supplies power from the power supply to a first load,
the first power supply switch device including:
a first main relay which switches between an ON state in which power is supplied from the power supply to the first load and an OFF state in which power is not supplied;
a first sub relay provided in parallel with the first main relay, the first sub relay switching between the ON state in which power is supplied from the power supply to the first load and the OFF state in which power is not supplied, so as to prevent a rush current from flowing into the first load; and
a first control unit connected to a first main control line for controlling the first main relay and a first sub control line for controlling the first sub relay, and configured to be driven by power supplied from the power supply via one of the first main relay and the first sub relay,
the second power supply switch device supplies power from the power supply to a second load,
the second power supply switch device including:
a second main relay which switches between an ON state in which power is supplied from the power supply to the second load and an OFF state in which power is not supplied;
a second sub relay provided in parallel with the second main relay, the second sub relay switching between the ON state in which power is supplied from the power supply to the second load and the OFF state in which power is not supplied, so as to prevent a rush current from flowing into the second load; and
a second control unit connected to a second main control line for controlling the second main relay and a second sub control line for controlling the second sub relay, and configured to be driven by power supplied from the power supply via one of the second main relay and the second sub relay,
the power supply control system further comprises a common control line connected to the first sub control line and the second sub control line,
the first control unit is further configured to control the second sub relay via the common control line, and
the second control unit is further configured to control the first sub relay via the common control line.

2. The power supply control system according to claim 1, wherein when the first main relay is in the ON state,
the first control unit is configured to set the second sub relay to the ON state for a predetermined time period via the common control line, and
the second control unit is configured to be activated in response to a change of the second sub relay to the ON state, and to set the second main relay to the ON state while the second sub relay is in the ON state.

3. The power supply control system according to claim 2, wherein the second control unit is further configured to
obtain operation information indicating whether or not the second load should operate at this point, and
set the second main relay to the OFF state when the operation information indicates that the second load should not operate.

4. The power supply control system according to claim 1, further comprising
a start-up circuit connected to the common control line, and being for controlling the first sub relay and the second sub relay.

5. A power supply control system comprising
a first device and a second device each connected to a power supply,
the first device including:
a first load to be driven by power supplied from the power supply;
a first main relay which switches between an ON state in which power is supplied from the power supply to the first load and an OFF state in which power is not supplied;
a first sub relay provided in parallel with the first main relay, the first sub relay switching between the ON state in which power is supplied from the power supply to the first load and the OFF state in which power is not supplied, so as to prevent a rush current from flowing into the first load; and
a first control unit connected to a first main control line for controlling the first main relay and a first sub control line for controlling the first sub relay, and configured to be driven by power supplied from the power supply via one of the first main relay and the first sub relay,
the second device including:
a second load to be driven by power supplied from the power supply, a second main relay which switches between an ON state in which power is supplied from the power supply to the second load and an OFF state in which power is not supplied;

a second sub relay provided in parallel with the second main relay, the second sub relay switching between the ON state in which power is supplied from the power supply to the second load and the OFF state in which power is not supplied, so as to prevent a rush current from flowing into the second load; and a second control unit connected to a second main control line for controlling the second main relay and a second sub control line for controlling the second sub relay, and configured to be driven by power supplied from the power supply via one of the second main relay and the second sub relay, wherein the power supply control system further comprises a common control line connected to the first sub control line and the second sub control line, the first control unit is further configured to control the second sub relay via the common control line, the second control unit is further configured to control the first sub relay via the common control line.

6. The power supply control system according to claim 5, wherein the first load and the second load are storage batteries for storing power supplied from the power supply.

* * * * *